United States Patent
Dailey et al.

(10) Patent No.: US 6,264,428 B1
(45) Date of Patent: Jul. 24, 2001

(54) COOLED AEROFOIL FOR A GAS TURBINE ENGINE

(75) Inventors: Geoffrey M Dailey; Peter A Evans; Richard A B McCall, all of Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/480,691

(22) Filed: Jan. 11, 2000

(30) Foreign Application Priority Data

Jan. 21, 1999 (GB) .................................. 9901218

(51) Int. Cl.[7] ....................................... F01D 5/18
(52) U.S. Cl. ................. 416/97 R; 416/189; 416/192; 415/115
(58) Field of Search ..................... 415/115, 116; 416/96 R, 96 A, 97 R, 97 A, 92, 189, 191, 192

(56) References Cited

U.S. PATENT DOCUMENTS

| | | | |
|---|---|---|---|
| 3,427,001 | * 2/1969 | Malley et al. | 416/92 |
| 3,533,711 | * 10/1970 | Kercher | 416/96 R |
| 3,533,712 | * 10/1970 | Kercher | 416/92 |
| 3,628,885 | * 12/1971 | Sidenstick et al. | 416/92 |
| 4,474,532 | * 10/1984 | Pazder | 416/92 |
| 4,992,206 | * 2/1991 | Ohtomo et al. | 416/97 R |
| 5,215,431 | 6/1993 | Derrien . | |
| 5,342,172 | * 8/1994 | Coudray et al. | 416/97 R |
| 5,387,086 | * 2/1995 | Frey et al. | 416/97 R |
| 5,562,409 | * 10/1996 | Livsey et al. | 415/115 |
| 5,700,131 | * 12/1997 | Hall et al. | 416/97 R |
| 5,702,232 | * 12/1997 | Moore | 416/97 R |
| 5,813,836 | * 9/1998 | Starkweather | 416/97 R |

FOREIGN PATENT DOCUMENTS

| | | |
|---|---|---|
| 0562944 A | 9/1993 | (EP) . |
| 1467197 SP | 3/1977 | (GB) . |
| 2319567 A | 5/1998 | (GB) . |
| 60-135606 | * 7/1985 | (JP) ........ 416/92 |
| 60-198305 | * 10/1985 | (JP) ........ 416/97 R |

* cited by examiner

Primary Examiner—Christopher Verdier
(74) Attorney, Agent, or Firm—W. Warren Taltavull; Manelli, Denison & Selter PLLC

(57) ABSTRACT

A hollow cooled aerofoil blade (10) is provided with a central, lengthways extending plenum (16) and has pressure and suction flanks (20,15). The suction flank (15) has lengthways extending passages (21) therein that direct cooling air from the root region (13) into the central plenum (16). From the central plenum, the cooling air flows through a first set of apertures (27) into lengthways extending passages (28) in the pressure flank (20). The cooling air then flows through a second set of apertures (30) in the pressure flank to provide film cooling of the pressure flank (20) external surface.

12 Claims, 2 Drawing Sheets

COOLED AEROFOIL FOR A GAS TURBINE ENGINE

FIELD OF THE INVENTION

This invention relates to a cooled aerofoil for a gas turbine engine.

BACKGROUND OF THE INVENTION

Gas turbine engines of the axial flow type conventionally include turbines that are made up of axially alternate annular arrays of radially extending stator aerofoil vanes and rotary aerofoil blades. The demands of modern gas turbine engines dictate that the gases that flow through, and thereby drive, the turbine are at extremely high temperature. As the gases flow through the turbine, their temperature progressively falls as they drive the turbine. However, notwithstanding this, the gas temperatures in the higher pressure regions of the turbine are so high that some form of aerofoil cooling is required.

Conventionally, turbine aerofoils, both blades and vanes, are cooled internally with air that has been tapped from the gas turbine engine's compressor. Using engine compressor air in this manner does, however, carry a penalty in terms of the overall operating efficiency of the engine. Thus generally speaking, the larger the percentage of air taken from the compressor, the greater the adverse effect there is upon overall engine operating efficiency.

Many efforts have been made in the past to make efficient use of compressor-derived air in the cooling of aerofoils. These efforts have centered mainly around the design of aerofoils provided with internal passages for the flow of cooling air. Typically such passages are in a serpentine configuration to provide convection cooling and some of the air from the passages is exhausted through small holes that provide communication between the passages and the aerofoil external surface. As the air is exhausted from the holes, it forms a film that provides additional aerofoil cooling.

Aerofoils cooled in this manner are often complex internally and hence difficult and expensive to manufacture. Moreover, they may not be as effective as is desirable in providing overall aerofoil cooling in view of the air pressure losses that are associated with flowing the cooling air through the many turns in the small diameter passages within the aerofoil.

It has been suggested in FR2,569,225 to provide a hollow aerofoil in which the walls of the aerofoil are provided with radially extending passages. The passages are in communication with the hollow aerofoil interior and also with the external surface of the aerofoil. Cooling air is supplied to the central aerofoil chamber from where it flows into the radially extending passages. From the radially extending passages, it flows on to the aerofoil exterior surface to provide film cooling thereof.

Although such aerofoils are cooled effectively, the pursuit of greater engine efficiency makes yet more effective cooling a highly desirable objective. It is an object of the present invention to provide such an aerofoil.

SUMMARY OF THE INVENTION

According to the present invention a cooled aerofoil for a gas turbine engine is hollow having a wall defining a central, lengthways extending plenum, said wall being configured to define a leading edge, trailing edge, suction flank and pressure flank of said aerofoil, said suction and pressure flanks interconnecting said leading and trailing edges and having a plurality of passages extending lengthways therethrough, means being provided to supply cooling air to each of said suction flank passages at one extent of said aerofoil, said suction flank passages being configured to subsequently direct that cooling air into said central plenum at the opposite extent of said aerofoil to thereby provide convection cooling of said suction flank, said pressure flank being provided with a first array of apertures interconnecting said pressure flank passages with said central plenum to facilitate the flow of at least some of said cooling air from said central plenum into said pressure flank passages and a second array of apertures interconnecting said pressure flank passages with the outer surface of said pressure flank to facilitate the exhaustion of said cooling air from said pressure flank passages to provide film cooling of said pressure flank outer surface.

Means may be provided to direct some of the cooling air from said central plenum to the region of said aerofoil trailing edge to provide cooling thereof.

Said means to direct some of said cooling air from said central plenum to the region of said aerofoil trailing edge may comprise a secondary plenum positioned alongside said central plenum, said secondary plenum being interconnected with said central plenum to provide flow communication therebetween, and is also in communication with the external surface of said aerofoil adjacent said trailing edge to facilitate the exhaustion of said cooling air from said secondary plenum.

Said pressure flank passages are preferably configured to define internal walls upon which said cooling air from said central plenum impinges having flowed through said first array of apertures.

Said pressure flank passages may be of elongate cross-sectional shape.

Said aerofoil may be in the form of a rotor blade, having a root portion at one extent thereof for attachment to a rotor disc of a gas turbine engine and a tip at the other end thereof.

Preferably said suction flank passages each extend from the region of said root portion to the region of said tip portion, said means to supply cooling air to said suction flank passages being located in said root portion region so that said cooling air is exhausted from said suction flank passages into said central plenum in the region of said tip portion.

Preferably the portion of said suction flank between said suction flank passages and said central plenum is so configured and arranged as to carry the majority of centrifugal loads operationally imposed upon said aerofoil.

Said aerofoil is preferably provided with at least one lengthways extending passage adjacent said leading edge thereof that is in communication with said cooling air supply means in said root portion so as to be provided with a supply of cooling air independent of that supplied to said central plenum.

Cooling passages may be provided in said leading edge region to exhaust cooling air from said leading edge passage on to said aerofoil external surface to provide film cooling thereof.

Said aerofoil may be provided with a shroud at said tip.

Said suction flank passages may each be of generally serpentine configuration.

BRIEF DESCRIPTION OF THE DRAWINGS

The present invention will now be described, by way of example, with reference to the accompanying drawings in which.

DETAILED DESCRIPTION OF THE INVENTION

Figure 1:
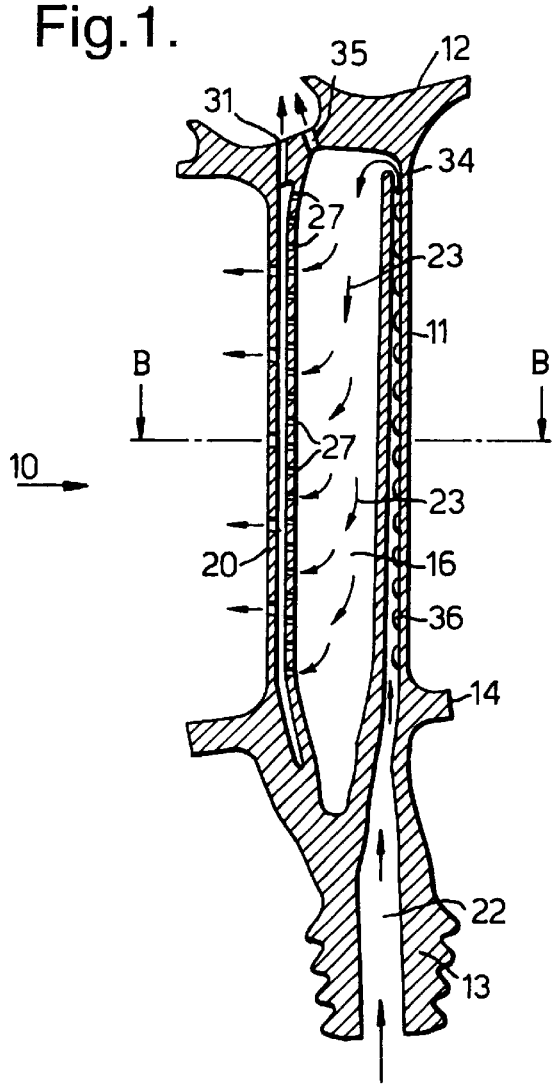
FIG. 1 is a view on section line A—A of FIG. 2 showing an aerofoil blade in accordance with the present invention.

With reference to FIG. 1, an aerofoil blade 10 for use in the high pressure turbine of a gas turbine engine (not shown) is of conventional external configuration. It comprises an aerofoil cross-section portion 11 having a shroud 12 at its radially outer extent, a root 13 at its radially inner extent and a platform 14 situated between the aerofoil and root portions 11 and 13. The platform 14 serves to define part of the boundary of the gas path over the aerofoil portion 11 as does the shroud 12. It will be appreciated, however, that it may be desirable in certain embodiments to omit the shroud 12. The root 13 is of the well-known fir-tree configuration to enable it to fit into a correspondingly shaped slot in a rotor disc along with a plurality of similar aerofoil blades. Accordingly, when the terms "radially inner" and "radially outer" are used in the present specification, they are with respect to the axis of rotation of such a disc.

Figure 2:
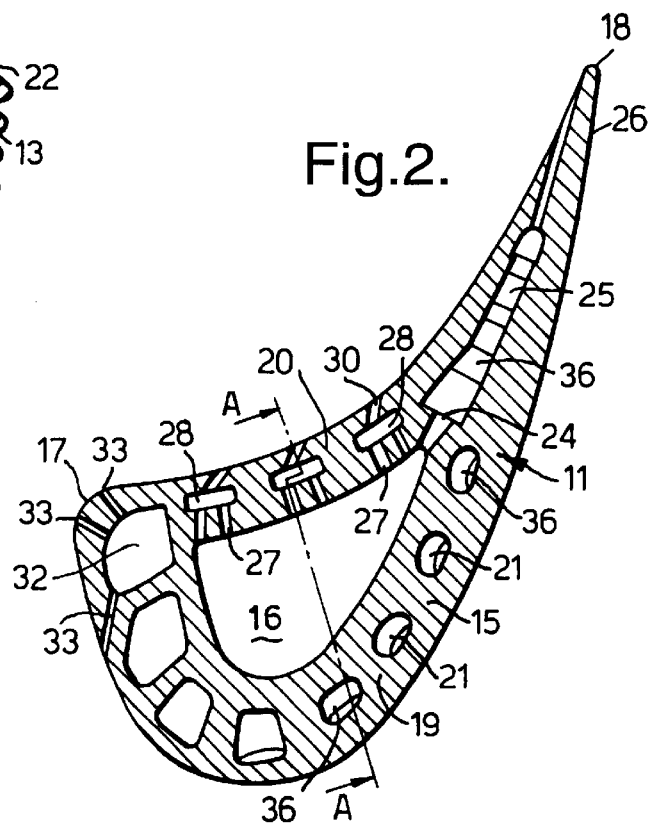
FIG. 2 is a view on section line B—B of FIG. 1.

The aerofoil portion 11 is hollow. Referring also to FIG. 2, it is made up of a wall 15 which defines a central plenum 16. The wall 15 is made up of leading and trailing edges 17 and 18 respectively which are interconnected by suction and pressure flanks 19 and 20 respectively.

Although in this embodiment of the present invention, the central plenum 16 is effectively a single chamber, it will be appreciated that this may not always be appropriate. Thus there could be situations, when for instance additional strength is required, in which the plenum 16 is divided into a number of elongate chambers by one or more webs interconnecting the suction and pressure flanks 19 and 20 respectively. If such webs are present, it would normally be desirable to provide them with apertures to facilitate the flow of air between those chambers. Thus, under such circumstances, the plenum 16 still functions as a single plenum.

The suction flank 19 has a plurality of cooling air passages 21 extending lengthways therethrough from one extent of the aerofoil portion 11 to the other. As can be seen most clearly in FIG. 1, the passages 21 in the aerofoil suction flank 19 are fed with a supply of cooling air from a cooling air inlet passage 22 situated in the radially inner end of the aerofoil blade 10 at its root 13. The air inlet passage 22 is itself provided with a flow of cooling air derived from the compressor (not shown) of the engine carrying the blade 10.

The cooling air flow through the suction flank passages 21 is arranged to be of relatively high velocity so as to provide effective convection cooling of the suction flank 19. This obviates the need to provide film cooling holes in the suction flank 19, thereby avoiding the performance penalties that such holes provide when located on suction flanks. Thus film cooling usually has a disruptive effect upon the gas flow over a suction flank.

In order to further enhance the cooling of the suction flank 19, a plurality of turbulators 36 are provided on the walls of the suction flank passages 21. These serve to enhance the heat exchange relationship between the cooling air and the suction flank 19.

The radially outer extents of the suction flank cooling air passages 21 terminate immediately radially inwardly of the shroud 12. The passage outlets 34 are so configured that the cooling air exhausted from them is directed into the central plenum 16. The separate cooling air flows from the suction flank passages 21 combine within the central plenum 16 and proceed to flow in a radially inward direction within the central plenum 16 as indicated by the arrows 23. The passage outlets 34 are angled at about 45 degrees with respect to the air flows over them. This is to ensure that at least some of the dust and other particulate material inevitably suspended in the air flows is directed towards an exhaust hole 35 positioned at the radially outer extent of the plenum 16. The exhaust hole 35 is in communication with the exterior of the shroud 12, thereby permitting the dust to be exhausted from the plenum 16 where it could cause hole blockage problems.

Conventionally, the aerofoil blade 10 would be manufactured using the well-known lost wax casting process. The constraints of this process are such that in certain cases, it may be necessary to provide certain casting core components that ultimately result in the provision of a small number of holes interconnecting the suction flank passages 21 with the central plenum 16 towards the radially outer extents of the suction flank passages 21. Such holes would result in a small proportion of cooling air entering the central plenum 16 early. However, this small air flow has a minimal effect upon the overall mode of operation of the present invention and can generally be disregarded.

Figure 4:
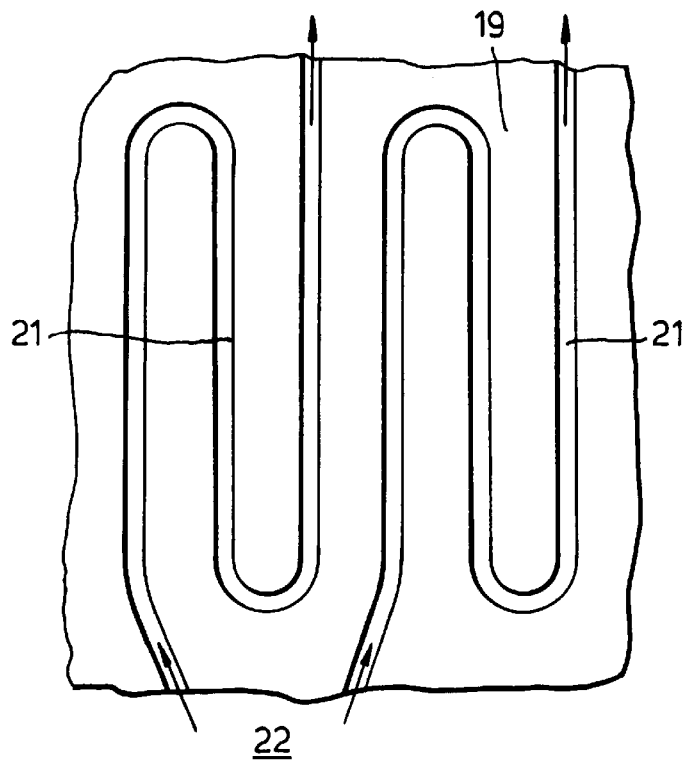
FIG. 4 is a view, in schematic form, of an alternative form of cooling fluid passage configuration in part of an aerofoil blade in accordance with the present invention.

Although in the presently described embodiment, each of the suction flying passages 21 is supplied directly with cooling air from the cooling air inlet passage 22, it is envisaged that under certain circumstances, it may be desirable to arrange for the air to flow through the suction flank in a slightly different manner. More specifically, in an alternative embodiment, the suction flank passages 21 are arranged in a serpentine configuration as is shown in schematic form in FIG. 4. Thus, cooling air from the cooling air inlet passage is directed into only some of the suction flank passages 21 (in this particular case, two). The air then flows in a radially outward direction through the suction flank passages 21 in the manner of the originally described embodiment. However, instead of being exhausted directly into the central plenum 16, the suction flank passages turned through 180 degrees and direct the cooling air back towards the root region 13. After the air has returned along virtually the whole length of the airfoil portion 11, the suction flank passage turns again through 180 degrees and directs the cooling air back towards the shroud 12. The suction flank cooling air passages 21 terminate at the shroud 12 to exhaust the cooling air into the central plenum in the manner described earlier.

This serpentine arrangement of the suction surface passages 21 ensures the cooling air flowing through them is used in as effective a manner as possible in providing convective cooling of the suction flank 19.

Some of the cooling air within the central plenum 16 is exhausted through a radially elongate aperture 24 in the plenum 16 wall into a passage 25 provided in the trailing edge region of the aerofoil blade 10.The passage 25 includes a number of pedestals 36 which serve to decrease the cross-sectional area of the passage 25 and thereby increase the velocity of the cooling air flowing through it, providing in turn, enhanced cooling. From the passage 25, the cooling air flows through a series of further passages 26 interconnecting the passage 25 with the trailing edge 18 from where it is exhausted into the gas stream that operationally flows over the aerofoil portion 12.

Figure 3:
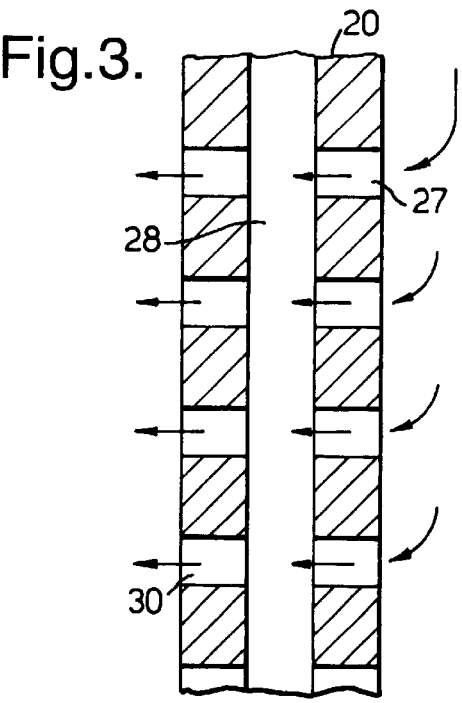
FIG. 3 is a view on an enlarged scale of part of the drawing shown in FIG. 1.

The remainder of the cooling air within the central plenum 16 passes through a plurality of apertures 27 provided in the pressure flank 20. The apertures 27, which can also be seen in FIG. 3, interconnect the central plenum 16 with a plurality of cooling air passages 28 that extend lengthways through the pressure flank 20. The pressure flank passages 28 each extend from the region of the platform 14 to the shroud 12.

As can be seen in FIG. 2, the pressure flank passages 28 are of elongate cross-sectional shape so as to define two walls that are generally parallel with each other and with the inner and outer surfaces of the pressure flank 20. The apertures 27 are arranged so that the cooling air passing through them impinges upon the opposite wall of the passage 28. This makes an effective contribution to the cooling of the pressure flank 20. It may be desirable in certain cases to modify the surface of the wall upon which the cooling air impinges in order to enhance its heat exchange relationship therewith.

The cooling air then proceeds to flow through the pressure flank passages 28, providing additional cooling of the pressure flank 20 by convection. The air is exhausted from the pressure flank passages 28 through a plurality of apertures 30 interconnecting the pressure flank passages 28 with the exterior surface of the pressure flank 20. The apertures 30 are angled with respect to the pressure flank 20 exterior surface so that the air exhausted therefrom provides a film of cooling air over at that exterior surface, thereby providing still further cooling of the pressure flank 20.

The shroud 12 has a minor passage 31 therein that is in communication with the pressure flank passages 28 and the radially outer surface of the shroud 12. There is a small flow of cooling air through the minor passage 31 that carries with it any remaining dust or other small particles that may be suspended in the cooling air flow from the central plenum. This is to ensure that blockage of the apertures 27 and 30 is substantially avoided.

A further air inlet passage (not shown) provided in the root region 13 directs cooling air into a lengthways extending passage positioned adjacent the airfoil leading age 17, thereby providing convective cooling of the region around the leading age 17. The cooling air is exhausted from the leading edge passage 32 through a plurality of small passages 33 that terminate at the surface of the leading edge 17 region to provide film cooling thereof.

The aerofoil blade 10 thus contains a large number of small apertures and passages to enable the cooling air to provide effective blade cooling. However, it will be appreciated that the presence of such apertures and passages could have a detrimental effect upon the life properties of the blade 10. Specifically, the apertures in particular could serve as sites for the initiation and propagation of cracks. In order to counter this, the aerofoil blade 10 is designed in such a manner that the major centrifugal loads imposed thereon in operation are biased towards the portion of the suction flank 15 located between the passages 21 therein and the central plenum 16. This portion of the suction flank 19 is designed to include as few potentially crack-initiating features as possible and be of sufficient strength to withstand the centrifugal loads imposed upon it.

Although the present invention has been described with reference to a shrouded aerofoil blade, it will be appreciated that could be applied to unshrouded blades with equal effectiveness. Moreover, it will also be appreciated that the present invention could also be applied to stator aerofoil vanes. However in such an application, it would not of course be necessary to take into account any centrifugal loading of the vane.

It will be seen therefore that the present invention provides an effective means for cooling the aerofoil portions of gas turbine blades and vanes. Since the cooling air employed provides cooling by convection impingement and film cooling, it is effectively used more than once, so ensuring that very efficient use is made of that cooling air. This in turn means that smaller amounts of cooling air are needed to provide effective cooling than is the case with blades and vanes provided with more traditional air cooling systems.

What is claimed is:

1. A hollow cooled aerofoil for a gas turbine engine having a wall defining a central, lengthways extending central plenum, said wall being configured to define a leading edge, trailing edge, suction flank and pressure flank of said aerofoil, said suction and pressure flanks interconnecting said leading and trailing edges and having a plurality of passages extending lengthways therethrough, means being provided to supply cooling air to each of said suction flank passages at one extent of said aerofoil, said suction flank passages being configured to subsequently direct at least the majority of that cooling air into said central plenum at the opposite extent of said aerofoil to thereby provide convection cooling of said suction flank, said pressure flank being provided with a first array of apertures interconnecting said pressure flank passages with said central plenum to facilitate the flow of at least some of said cooling air from said central plenum into said pressure flank passages and a second array of apertures interconnecting said pressure flank passages with the outer surface of said pressure flank to facilitate the exhaustion of said cooling air from said pressure flank passages to provide film cooling of said pressure flank outer surface.

2. A hollow cooled aerofoil as claimed in claim 1 wherein means are provided to direct some of the cooling air from said central plenum to the region of said aerofoil trailing edge to provide cooling thereof.

3. A hollow cooled aerofoil as claimed in claim 2 wherein said means to direct some of said cooling air from said central plenum to the region of said aerofoil trailing edge comprises a secondary plenum positioned alongside said central plenum, said secondary plenum being interconnected with said central plenum to provide flow communication therebetween, and is also in communication with the external surface of said aerofoil adjacent said trailing edge to facilitate the exhaustion of said cooling air from said secondary plenum.

4. A hollow cooled aerofoil as claimed in claim 1 wherein said pressure flank passages are configured to define internal walls upon which said cooling air from said central plenum impinges having flowed through said first array of apertures.

5. A hollow cooled aerofoil as claimed in claim 4 wherein said pressure flank passages are of elongate cross-sectional shape.

6. A hollow cooled aerofoil as claimed in claim 1 wherein said aerofoil is in the form of a rotor blade, having a root portion at one extent thereof for attachment to a rotor disc of a gas turbine engine and a tip at the other end thereof.

7. A hollow cooled aerofoil as claimed in claim 6 wherein said suction flank passages each extend from the region of said root portion to the region of said tip, said means to supply cooling air to said suction flank passages being located in said root portion region so that said cooling air is exhausted from said suction flank passages into said central plenum in the region of said tip.

8. A hollow cooled aerofoil as claimed in claim 6 wherein the portion of said suction flank between said suction flank passages and said central plenum is so configured and arranged as to carry the majority of centrifugal loads operationally imposed upon said aerofoil.

9. A hollow cooled aerofoil as claimed in claim 6 wherein said aerofoil is provided with at least one lengthways extending passage adjacent said leading edge thereof that is in communication with said cooling air supply means in said root portion so as to be provided with a supply of cooling air independent of that supplied to said central plenum.

10. A hollow cooled aerofoil as claimed in claim 9 wherein cooling passages are provided in said leading edge region to exhaust cooling air from said leading edge passage on to said aerofoil external surface to provide film cooling thereof.

11. A hollow cooled aerofoil as claimed in claim 6 wherein said aerofoil is provided with a shroud at said tip.

12. A hollow cooled aerofoil for a gas turbine engine having a wall defining a central, lengthways extending central plenum, said wall being configured to define a leading edge, trailing edge, suction flank and pressure flank of said aerofoil, said suction and pressure flanks interconnecting said leading and trailing edges and having a plurality of passages extending lengthways therethrough, means being provided to supply cooling air to each of said suction flank passages at one extent of said aerofoil, said suction flank passages being configured to subsequently direct at least the majority of that cooling air into said central plenum at the opposite extent of said aerofoil to thereby provide convection cooling of said suction flank, said pressure flank being provided with a first array of apertures interconnecting said pressure flank passages with said central plenum to facilitate the flow of at least some of said cooling air from said central plenum into said pressure flank passages and a second array of apertures interconnecting said pressure flank passages with the outer surface of said pressure flank to facilitate the exhaustion of said cooling air from said pressure flank passages to provide film cooling of said pressure flank outer surface, said suction flank passages are of generally serpentine configuration.

* * * * *